United States Patent Office 3,120,552
Patented Feb. 4, 1964

3,120,552
METHOD FOR THE MANUFACTURE OF ALKALI METAL OR ALKALINE EARTH METAL SULPHATES OF HIGH-MOLECULAR, UNSATURATED FATTY ALCOHOLS
Karl Goldann, Dusseldorf, Germany, assignor to Bohme Fettchemie G.m.b.H., Dusseldorf, Germany, a corporation of Germany
No Drawing. Filed May 10, 1960, Ser. No. 27,986
Claims priority, application Germany May 14, 1959
8 Claims. (Cl. 260—459)

This invention relates to a process for sulfating high molecular, unsaturated fatty alcohols with amidosulfonic acid to obtain a sulfated product having the double bonds preserved. It more particularly relates to the use of low-molecular, tertiary alkyl amines as a catalyst in such a sulfation process.

It is known that high-molecular, unsaturated fatty alcohols can be sulphated with amidosulphonic acid and that in this way sulphation products are obtained whose double bonds are essentially preserved. Further, it is known that catalysts may be concurrently employed in this method. For this purpose, amides, such as urea, dicyanodiamide, acetamide, as well as heterocyclic bases, e.g. morpholine, have been preferably recommended. However, the above methods have not been found satisfactory with regard to the degree of sulphation obtainable. Moreover, the separation and working-up of the catalysts presents difficulties in the use of these methods.

It is an object of this invention to provide a process for sulfating high-molecular, unsaturated fatty alcohols to a high degree of sulfation.

It is a further object to provide a catalytic sulfation process for high-molecular, unsaturated fatty alcohols wherein the catalyst may be readily removed from the sulfation product.

These and other objects of my invention will become apparent as the description thereof proceeds.

I have now found that very valuable sulphation products of high-molecular, unsaturated fatty alcohols can be obtained if low-molecular, tertiary alkylamines, in particular triethylamine, are used as catalysts in the sulphation with amidosulphonic acids. The ammonium salts of the sulphates formed in this way can be salted out with alkali metal or alkaline earth metal hydroxides, and the pastes obtained thereby can be spray-dried after the addition of ordinary extenders, like sodium sulphate or other salts ordinarily used as detergent additives.

The degree of sulphation attained with this method of operation is 92% and above. Highly concentrated sodium salt pastes, which are extremely low in salt content and have an active substance content of up to 80% can be obtained in this way, and from these pastes, following the addition of the above-named salts and spray-drying, brightly-colored, highly pourable powders, can be obtained. These powders have a faint odor and are not sticky. The iodine number of the alcohols obtained from the sulphation products by means of saponification is only slightly below the iodine number of the unsaturated alcohols original used. Products with outstanding washing properties are obtained.

It has been found that the use of triethylamine as catalyst, compared with the use of morpholine (which had heretofore been considered as the preferred catalytic medium), offers additional advantages insofar as it is possible to work with smaller excesses of amidosulphonic acid and further, also, that a smaller quantity of catalyst is required. In salting the products out with caustic soda solution and subsequent spray-drying, the removal of the ammonia and of the catalyst can be attained simultaneously with the compounding. In order to obtain the corresponding pastes, the raw salted-out product is passed through a thin-layer evaporator.

The method can be used to sulfate all kinds of olefinic alcohols having up to 22 carbon atoms or their derivatives, e.g. oleyl alcohol, mixtures of unsaturated fatty alcohols from marine animal oils, linseed oil alcohol, ethoxylation products of these alcohols, and the like. Alkali metal hydroxides or alkaline earth metal hydroxides, e.g. magnesium hydroxide, are suitable examples of neutralizers for the acid sulphates obtained.

The following specific examples are given to illustrate my invention and to enable persons skilled in the art to better understand and practice the invention and are not intended to be limitative.

Example I 1,340 grams of oleyl alcohol (iodine number 95) were placed into a 2.5 liter three-neck sulphation flask equipped with a powerful high-speed agitator, thermometer, nitrogen feed tube and a ventilation opening. Under rapid stirring and introduction of nitrogen, 520 gm. of dry, finely-crystalline amidosulphonic acid (theoretical quantity 485 gm.) were introduced at 20° C. in such a way that a suspension was formed. Thereupon, the temperature was increased to 85° C. and 10 gm. of triethylamine were added. The temperature was increased to 90° C. which initiated the reaction. During the process, the temperature rose to 110° C. The temperature returned to 100° C. when heating was stopped and was thereupon maintained at approximately 95° C. 10 gm. of triethylamine was added at 1, 2, 3 and 3½ hrs. respectively, following the first triethylamine addition. Thereafter, stirring was continued for 2½ hrs. at 115° C. At approximately an hour after the beginning of the reaction, the liquid suspension changed into a soft, viscous paste which was slightly foamy. At the end of the reaction, the paste was yellowish in color. The paste was allowed to cool to 80° C. and 3400 grams of water of approximately 70° C. were introduced. If it was desired to produce a paste, adjustment to pH 6.5 was made by the addition of some soda solution. The yield was equivalent to the reaction components, in other words, it was quantitative.

Example II

Two kilograms of ammonium oleyl sulphate paste, as produced in Example I, 200 grams of 37% caustic soda solution and 2 kilograms of water were stirred until homogeneous and passed through an oil-fired thin-layer evaporator within approximately 1½ hours at 105° C. and 35 millimeters of mercury. By distilling off the ammonia and some of the water (recoverable as ammonia water), a brightly-colored, brownish, ammonia-free sodium oleyl sulphate paste was obtained. The yield was 3030 grams, sulphation degree 99%, and the iodine number of the alcohol portion was 87.

A 1–2% chlorine solution (13% active chlorine) was used for bleaching the sodium oleyl sulphate paste. Stirring was continued for 30 minutes at 50° C., in the process of which the iodine number decreased only slightly, a satisfactory bleaching effect was also attained at 20° C. in the process of which the iodine number remained practically constant.

Example III

For the manufacture of a spray-dried product, 4 kilograms of ammonium oleyl sulphate paste as produced in Example I was mixed under stirring at room temperature with 460 grams of 37% caustic soda solution (15% excess relative to ammonium salt) and with a 70° C. solution of 500 grams of sodium sulphate in 4 kilograms of water. Thereupon, the paste was spray-dried at 103 to 105° C. A slightly yellowish (white, in the case of products having a lower iodine number), free-flowing powder, which no longer smells of ammonia, was obtained. It formed a clear solution in water and yielded viscous solutions having a soap-like, stable foam. The sulphation degree was 99%, and the iodine number of the alcohol portion was 85.

While I have set forth certain specific embodiments and preferred modes of practice of my invention, it will be understood that the invention is not limited thereto and that various changes and modifications may be made in the invention without departing from the spirit of the disclosure and the scope of the appended claims.

I claim:

1. A process for producing sulfates of an olefinically unsaturated fatty alcohol having from 10 to 22 carbon atoms in the molecule, selected from the group consisting of alkali and alkaline earth metal sulfates, which comprises the steps of reacting 1 mol of an olefinically unsaturated fatty alcohol having from 10 to 22 carbon atoms in the molecule with less than 1 mol amidosulfonic acid in the presence of triethyl amine as a catalyst at a temperature of at least about 90° C. and treating the product with hydroxides selected from the group consisting of alkali and alkaline earth metal hydroxides to salt out said sulfates.

2. The process of claim 1 wherein the high-molecular, unsaturated fatty alcohol is oleyl alcohol.

3. The process of claim 1 wherein the hydroxide is sodium hydroxide.

4. A process for producing sulfates of olefinically unsaturated fatty alcohols having from 10 to 22 carbon atoms in the molecule, selected from the group consisting of alkali and alkaline earth metal sulfates, which comprises the steps of reacting 1 mol of an olefinically unsaturated fatty alcohol having from 10 to 22 carbon atoms in the molecule with less than 1 mol amidosulfonic acid in the presence of triethyl amine as catalyst at a temperature of at least about 90° C. and treating the product with hydroxides selected from the group consisting of alkali and alkaline earth metal hydroxides to salt out said sulfates, and spray-drying said sulfates to convert them to a powder, whereby said catalyst and ammonia are simultaneously removed.

5. A process for producing sulfates of olefinically unsaturated fatty alcohols having from 10 to 22 carbon atoms in the molecule, selected from the group consisting of alkali and alkaline earth metal sulfates, which comprises the steps of reacting 1 mol of an olefinically unsaturated fatty alcohol having from 10 to 22 carbon atoms in the molecule with less than 1 mol amidosulfonic acid in the presence of triethyl amine as a catalyst at a temperature of at least about 90° C., and treating the product with hydroxides selected from the group consisting of alkali and alkaline earth metal hydroxides to salt out said sulfates, and converting said sulfates to a paste by evaporation of said catalyst and ammonia.

6. A process for producing sodium oleyl sulfate which comprises the steps of reacting 1 mol oleyl alcohol with less than 1 mol amidosulfonic acid in the presence of triethylamine as a catalyst at a temperature of at least about 90° C., treating the product with sodium hydroxide to salt out said sulfate, and separating said sulfate from said catalyst and ammonia.

7. A process for producing sodium oleyl sulfate, which comprises the steps of reacting 1 mol oleyl alcohol with less than 1 mol amidosulfonic acid in the presence of triethylamine as a catalyst at a temperature of at least about 90° C., treating the product with sodium hydroxide to salt out said sulfate, and spray-drying said sulfate to convert them to a powder whereby said catalyst and ammonia are simultaneously removed.

8. A process for producing sodium oleyl sulfate, which comprises the steps of reacting 1 mol oleyl alcohol with less than 1 mol amidosulfonic acid in the presence of triethylamine as a catalyst at a temperature of at least about 90° C., treating the product with sodium hydroxides to salt out said sulfate, converting said sulfate to a paste by evaporation of said catalyst and ammonia.

References Cited in the file of this patent

UNITED STATES PATENTS

| | | |
|---|---|---|
| 2,268,443 | Crowder | Dec. 30, 1941 |
| 2,649,469 | Neighbors | Aug. 18, 1953 |
| 2,687,420 | Brady | Aug. 24, 1954 |